(12) United States Patent
Linge et al.

(10) Patent No.: US 9,544,578 B2
(45) Date of Patent: Jan. 10, 2017

(54) PORTABLE ELECTRONIC EQUIPMENT AND METHOD OF CONTROLLING AN AUTOSTEREOSCOPIC DISPLAY

(75) Inventors: Anders Linge, Kävlinge (SE); Martin Ek, Dalby (SE); Jonas Gustavsson, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 372 days.

(21) Appl. No.: 14/372,945

(22) PCT Filed: Jan. 17, 2012

(86) PCT No.: PCT/EP2012/000207
§ 371 (c)(1),
(2), (4) Date: Jul. 17, 2014

(87) PCT Pub. No.: WO2013/107467
PCT Pub. Date: Jul. 25, 2013

(65) Prior Publication Data
US 2015/0009304 A1 Jan. 8, 2015

(51) Int. Cl.
*H04N 13/04* (2006.01)
(52) U.S. Cl.
CPC ...... *H04N 13/0402* (2013.01); *H04N 13/0406* (2013.01); *H04N 13/0409* (2013.01); *H04N 13/0472* (2013.01); *H04N 13/0475* (2013.01); *H04N 13/0484* (2013.01)
(58) Field of Classification Search
CPC ............ H04N 13/0402; H04N 13/0406; H04N 13/0409; H04N 13/0475; H04N 13/0484; H04N 13/0472

USPC .......................................................... 348/51
See application file for complete search history.

(56) References Cited

U.S. PATENT DOCUMENTS

| 2001/0026249 | A1 | 10/2001 | Bell et al. |
| 2007/0002130 | A1* | 1/2007 | Hartkop ................. H04N 7/141 348/14.16 |
| 2010/0295958 | A1 | 11/2010 | Larsson et al. |
| 2011/0242103 | A1 | 10/2011 | Han et al. |

(Continued)

FOREIGN PATENT DOCUMENTS

| CN | 1607418 A | 4/2005 |
| EP | 2 180 716 A1 | 4/2010 |

(Continued)

*Primary Examiner* — Allen Wong
(74) *Attorney, Agent, or Firm* — Wolf, Greenfield & Sacks, P.C.

(57) ABSTRACT

A portable electronic equipment (1) has an autostereoscopic display (11), a sensor device (2), and a controller (6, 7). The autostereoscopic display (11) comprises a display panel and an image directing device. The sensor device (2) is configured to capture distance information indicative of a distance of a user from the autostereoscopic display (11) and a direction in which the user is positioned. The controller (6, 7) is coupled to the autostereoscopic display (11) to control the display panel (12) and the image directing device based on the distance information and/or direction informa-tion. The controller (6, 7) is configured to compute plural images to be output based on the distance information, to control the display panel to output the computed plural images, and to control the image directing device based on the distance information and/or direction information.

15 Claims, 6 Drawing Sheets

(56) References Cited

U.S. PATENT DOCUMENTS

2012/0081521 A1\* 4/2012 Vilpponen ......... H04N 13/0025
348/51

FOREIGN PATENT DOCUMENTS

| GB | 2 405 543 A | 3/2005 |
|----|-------------|--------|
| WO | 01/18589 A1 | 3/2001 |

\* cited by examiner

PORTABLE ELECTRONIC EQUIPMENT AND METHOD OF CONTROLLING AN AUTOSTEREOSCOPIC DISPLAY

CROSS-REFERENCES TO RELATED APPLICATIONS

This application is a 35 U.S.C. §371 U.S. national entry of International Application PCT/EP2012/000207 having an International filing date of Jan. 17, 2012, the entire contents of which are incorporated herewith in its entirety.

FIELD OF THE INVENTION

The invention relates to a portable electronic equipment having an autostereoscopic display and to a method of controlling an autostereoscopic display. The invention relates in particular to such an equipment and method in which information on a user's position is monitored.

BACKGROUND OF THE INVENTION

A wide variety of portable electronic devices may be equipped with displays which provide dimensional information. Such stereoscopic imaging provides the illusion of depth to the user. This has a variety of applications in interfaces used for control operations and/or for entertainment purposes. For illustration, modern mobile telephones or personal digital assistants may be equipped with stereoscopic displays.

Autostereoscopic displays which do not require the user to wear specifically designed glasses for providing different images to the left and right eye are particularly attractive with regard to user convenience. Such autostereoscopic displays have a display panel which outputs plural images, and an optical device which directs one of the images to one eye and another one of the images to another eye of the user.

Conventionally, autostereoscopic displays have required the user to remain at a pre-defined position relative to the autostereoscopic display for obtaining good three-dimensional viewing experience. One approach to further enhance convenience for the user is based on using a multi-view configuration in which different perspective images are generated and displayed in various angular zones. This approach is computationally costly, as the constituent images of more than one perspective view must be computed even when there is only one user present in front of the display. Another approach to enhance convenience for the user is based on using an optical device overlaid on the display panel. The optical device can be controlled based on a direction in which the user is positioned relative to the autostereoscopic display.

While stereoscopic imaging can be implemented by generating only two images that are directed to the user's left and right eye, respectively, when a control of the optical device based on the direction in which the user is positioned is used, this still imposes limitations on the relative positions between the user and the autostereoscopic display where good depth illusion is provided by the autostereoscopic display.

SUMMARY OF THE INVENTION

Accordingly, there is a continued need in the art for a portable electronic equipment and for a method which address some of the above shortcomings. In particular, there is a continued need in the art for a portable electronic equipment and for a method which provide stereoscopic imaging for a greater variety of relative positions between user and autostereoscopic display.

According to an embodiment, a portable electronic equipment is provided. The portable electronic equipment comprises an autostereoscopic display, a controller, and a sensor device. The autostereoscopic display comprises a display panel and an image directing device. The image directing device is configured to direct a first image of plural images output by the display panel to a first eye of a user and a second image of the plural images to a second eye of the user. The sensor device is configured to capture distance information indicative of a distance at which the user is positioned from the autostereoscopic display and direction information indicative of a direction in which the user is positioned relative to the autostereoscopic display. The controller is coupled to the autostereoscopic display to control the display panel and the image directing device. The controller is coupled to the sensor device and is configured to compute the plural images to be output based on the distance information and/or direction information, to control the display panel to output the computed plural images, and to control the image directing device based on the distance information and/or direction information.

In the portable electronic equipment, both the display panel and the image directing device can be controlled based on the distance information. This allows high quality stereoscopic imaging to be realized over a range of distances between the user and the autostereoscopic display. The inconvenience which may result from restrictions on the distances at which the user may be positioned relative to the autostereoscopic display may be mitigated.

The image directing device may include one or plural electro-optical layers. The image directing device may include a lenticular sheet and/or a parallax barrier. The image directing device may include other componentry, such as electrically controllable elements which cast the first image to the first eye and the second image to the second eye of the user.

The controller may be configured to control the display panel and the image directing device based on both the distance information and the direction information.

The controller may be configured to compute the plural images based on the distance information and the direction information.

The controller may be configured to compute the first image and the second image having a parallax and perspective shift determined based on the distance information.

The controller may be configured to compute a three-dimensional depth map based on the distance information and the direction information, and to compute the plural images based on the three-dimensional depth map and an interocular separation.

The controller may be configured to control the image directing device to set a sweet spot of the autostereoscopic display which matches the distance information and the direction information.

The controller may be configured to computationally identify a configuration of the image directing device which reduces optical crosstalk between the first image and the second image at a location determined by the distance information and the direction information, and to control the image directing device based on the identified configuration.

The controller may be configured to monitor changes in the distance information and the direction information, and to re-compute the plural images in response to a change in the distance information or the direction information. The controller may be configured to control the image directing device in response to the change in the distance information or the direction information. The controller may be configured to control the image directing device to adjust a sweet spot of the autostereoscopic display such that it matches the new user position relative to the autostereoscopic display. The controller may be configured to re-compute the plural images such that the re-computed plural images have a parallax and perspective shift which is in accordance with the new user position.

The image directing device may comprise a liquid crystal layer.

The controller may be configured to control the liquid crystal layer based on the distance information to adjust a distance of a sweet spot of the autostereoscopic display such that it matches the distance information.

The image directing device may form a lenticular sheet which comprises the liquid crystal layer.

The controller may be configured to adjust a focal length of lenslets of the lenticular sheet.

The sensor device may be configured as a head tracker and/or eye tracker.

The sensor device may comprise at least one camera. The controller may be configured to determine a distance at which the user is positioned from the autostereoscopic display based on plural images captured by the at least one camera. The sensor device may comprise a camera array which captures a depth map, and the controller may be configured to determine the distance information based on the depth map.

The sensor device may comprise an acceleration sensor, such as a gyroscope, to determine an orientation or change in orientation of the autostereoscopic display in a world reference frame.

The portable electronic equipment may further comprise a communication interface for wireless communication with a mobile communication network.

According to another embodiment, a portable electronic equipment is provided. The portable electronic equipment comprises an autostereoscopic display, a controller, and a sensor device. The autostereoscopic display comprises a display panel and an image directing device, the image directing device being configured to direct a first image of plural images output by the display panel to a first eye of a user and a second image of the plural images to a second eye of the user. The controller is coupled to the autostereoscopic display to control the display panel and the image directing device. The sensor device is configured to capture distance information indicative of a distance at which the user is positioned from the autostereoscopic display. The image directing device comprises a liquid crystal cell. The controller is coupled to the sensor device and is configured to control the liquid crystal cell based on the distance information.

According to another embodiment, a method of controlling an autostereoscopic display is provided. The autostereoscopic display comprises a display panel and an image directing device, the image directing device directing a first image of plural images output by the display panel to a first eye of a user and a second image of the plural images to a second eye of the user. The method comprises receiving, from a sensor device, distance information indicative of a distance at which the user is positioned from the autostereoscopic display and direction information indicative of a direction in which the user is positioned relative to the autostereoscopic display. The method comprises computing the plural images to be output based on the distance information and/or direction information. The method comprises controlling the display panel to output the computed plural images. The method comprises controlling the image directing device based on the distance information and/or direction information.

The display panel and the image directing device may be controlled based on both the distance information and the direction information.

The plural images may be computed based on the distance information and the direction information.

The first image and the second image may be computed such that they have a parallax and perspective shift determined based on the distance information.

Computing the plural images may comprise computing a three-dimensional depth map based on the distance information and the direction information, with the plural images being computed based on the three-dimensional depth map and an interocular separation.

The image directing device may be controlled to set a sweet spot of the autostereoscopic display which matches the distance information and the direction information.

A configuration of the image directing device may be identified which reduces optical crosstalk between the first image and the second image at a location determined by the distance information and the direction information. The image directing device may be controlled to have the identified configuration, thereby reducing three-dimensional crosstalk at the determined user position.

Changes in the distance information and the direction information may be monitored. The plural images may be re-computed in response to a change in the distance information or the direction information. The image directing device may be controlled in response to the change in the distance information or the direction information. The image directing device may be controlled to adjust a sweet spot of the autostereoscopic display such that it matches the new user position relative to the autostereoscopic display. The plural images may be re-computed such that the recomputed plural images have a parallax and perspective shift which is in accordance with the new user position.

The image directing device may comprise a liquid crystal layer.

The liquid crystal layer may be controlled based on the distance information to adjust a distance of a sweet spot of the autostereoscopic display such that it matches the distance information.

The image directing device may form a lenticular sheet which comprises the liquid crystal layer. A focal length of lenslets of the lenticular sheet may be controlled based on the distance information.

The method may be performed by a controller of a portable electronic equipment in which the autostereoscopic display is installed.

According to another embodiment, a portable electronic equipment is provided. The portable electronic equipment comprises an autostereoscopic display, a controller, and a sensor device. The autostereoscopic display comprises a display panel and an image directing device. The image directing device is configured to direct a first image of plural images output by the display panel to a first eye and a second image of the plural images to a second eye of a user. The sensor device is configured to capture distance information indicative of a distance at which the user is positioned from the autostereoscopic display. The controller is coupled to the autostereoscopic display to control the display panel and the image directing device. The controller is coupled to the sensor device and is configured to compute the plural images to be output based on the distance information, to control the display panel to output the computed plural images, and to control the image directing device based on the distance information.

According to another embodiment, a method of controlling an autostereoscopic display is provided. The autostereoscopic display comprises a display panel and an image directing device, the image directing device directing a first image of plural images output by the display panel to a first eye of a user and a second image of the plural images to a second eye of a user. The method comprises receiving, from a sensor device, distance information indicative of a distance at which the user is positioned from the autostereoscopic display. The method comprises computing the plural images to be output based on the distance information. The method comprises controlling the display panel to output the computed plural images. The method comprises controlling the image directing device based on the distance information.

According to yet another embodiment, there is provided a non-transitory storage medium storing instruction code which, when executed by a controller of a portable electronic equipment, directs the portable electronic equipment to perform the method of any one aspect or embodiment.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION OF EMBODIMENTS OF THE INVENTION

Figure 1:
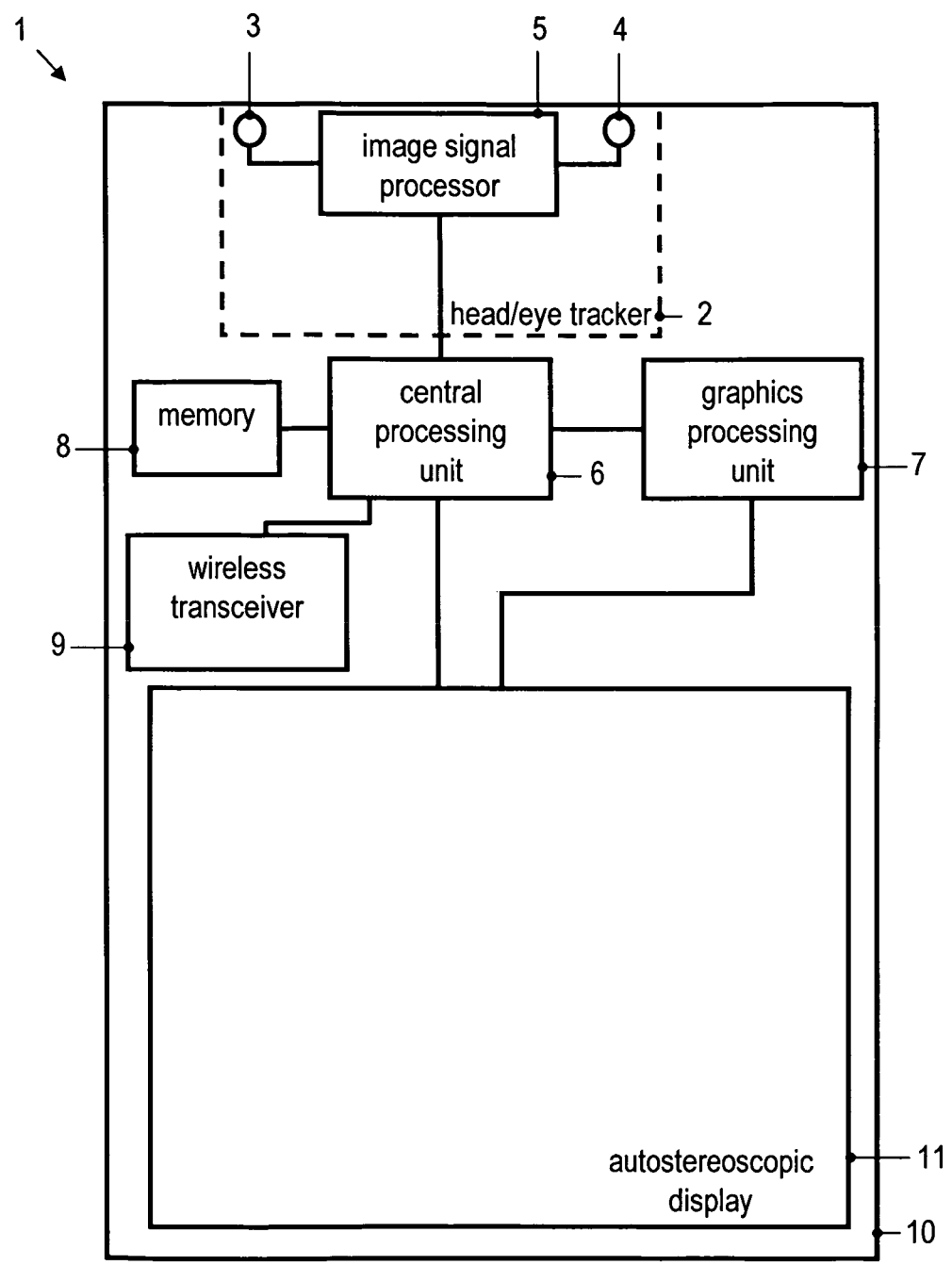
FIG. 1 is a schematic representation of a portable electronic equipment of an embodiment.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof.

The features of the various embodiments may be combined with each other, unless specifically noted otherwise.

A portable electronic equipment and methods of controlling an autostereoscopic display according to embodiments will be described. The portable electronic equipment has an autostereoscopic display. The autostereoscopic display includes a display panel which outputs plural images, which include a first image directed to a first eye of a user and a second image directed to a second eye of the user. The autostereoscopic display includes an image directing device to direct the first image to the first eye and the second image to the second eye. The image directing device may include one or plural electro-optical layers, for example. The portable electronic equipment comprises a sensor device which captures distance information indicating a distance at which the user is positioned from the autostereoscopic display. The sensor device may also be configured to sense a direction in which the user is positioned relative to the autostereoscopic display. The sensor device may be configured as a head tracker or eye tracker. A controller controls the at least one opto-electronic layer such that the sweet spot is set based on the sensed position of the user. Thereby, the sweet spot is made to follow the user's position relative to the autostereoscopic display. Additionally, the controller also controls the display panel based on the sensed position of the user relative to the autostereoscopic display. The first and second images are computed to have a parallax and perspective shift determined based on the user's position relative to the autostereoscopic display.

In the portable electronic equipments and methods of embodiments, the distance at which the user is located from the autostereoscopic display is monitored. The image directing device of the autostereoscopic display is controlled based on a distance at which the user is located from a plane of the autostereoscopic display. Thereby, the first image directed to the user's first eye and the second image directed to the user's second eye may be cast into the user's first and second eyes, even when the distance at which the user is located from a plane of the autostereoscopic display varies. Further, the display panel is controlled based on the distance at which the user is located from a plane of the autostereoscopic display. The first and second images may be generated to have a parallax determined based on the distance. The first and second images may be generated to have a perspective shift determined based on the distance. A similar adjustment may be made when the direction of the user relative to the autostereoscopic display varies. Stereoscopic imaging is provided which can accommodate greater ranges of varying distances.

Portable electronic equipment and methods of embodiments in which the sweet spot of the autostereoscopic display is adjusted based on a sensed distance at which the user is located from the autostereoscopic display and in which the images output by the display panel are updated in accordance with the sweet spot will be described in more detail with reference to the drawings.

FIG. 1 is a schematic block diagram representation of a portable electronic equipment 1 according to an embodiment. The portable electronic equipment 1 includes a head/eye tracker 2 and a controller coupled to the head/eye tracker 2. The controller may be one processor or may include plural processors, such as a central processing unit 6 and a graphics processing unit 7. The portable electronic equipment 2 also has an autostereoscopic display 11. The head/eye tracker 2 and the autostereoscopic display 11 may both be mounted to a housing 10 in a pre-defined and fixed relation to each other. The head/eye tracker 2 may additionally or alternatively include components provided separately from the housing 10. For illustration, the head/eye tracker 2 may include components integrated into an audio headset worn by the user.

The head/eye tracker 2 is configured to provide information on the position of the user relative to the portable electronic equipment 1. The head/eye tracker 2 may be configured to provide information on a distance at which the user is located from the portable electronic equipment 1 and, thus, from the autostereoscopic display 11. The head/eye tracker 2 may be configured to provide distance information which is indicative of the distance of the user's head or user's eyes from a characteristic plane of the autostereoscopic display 11. The head/eye tracker 2 may be configured to provide distance information which is indicative of the distance of the user's head or user's eyes from a display panel of the autostereoscopic display 11 or from a front plane of the autostereoscopic display 11. The head/eye tracker 2 may have any one of a variety of configurations. For illustration, the head/eye tracker 2 may include a camera array having a plurality of cameras 3, 4. Each one of the plural cameras 3, 4 may respectively be configured to generate image data representing an optical image. The cameras 3, 4 may respectively include CCD sensors, CMOS sensors or other suitable electro-optical components. The cameras 3, 4 may be formed on a common CCD or CMOS chip, e.g. so as to constitute an array camera. The cameras 3, 4 may have an overlapping field of view. The head/eye tracker 2 may include an image signal processor 5 configured to derive a depth map of objects in the viewing field of at least two cameras of the camera array. The image signal processor 5 may further be operative to perform image segmentation based on the depth map to derive distance information quantifying the distance at which the user is located. The image processor 5 may further derive direction information on a direction in which the user is positioned relative to the autostereoscopic display 11. With the positions of the autostereoscopic display 11 relative to the camera array being known, the position of the user relative to the autostereoscopic display 11 can be determined based on the images captured by the camera array. Alternatively, the head/eye tracker 2 may include a single camera which captures images of the user while the user faces the autostereoscopic display 11. The image signal processor 5 may perform object recognition in the captured image to identify the user's position. Tracking through plural image frames may be performed to estimate the distance and direction of the user. Alternatively or additionally to having one or more cameras, the head/eye tracker 2 may include an acceleration sensor, such as a gyroscope, to determine an angular position of the portable electronic equipment 1 and/or of the user's head.

The portable electronic equipment 1 may further comprise a memory 8 storing instruction code for the central processing unit 6. A wireless transceiver 9 may be coupled to the central processing unit 6. The wireless transceiver 9 may be configured for wireless communication under a wireless communication standard, such as GSM, 3GPP, UMTS, LTE, WLAN, or other communication standards. The central processing unit 6 may control the wireless transceiver 9 so as to enable wireless voice and/or data communication.

The portable electronic equipment 1 is configured such that the autostereoscopic display 11 is controlled based on the distance at which the user is located. Both optical characteristics of an electro-optical layer of the autostereoscopic display 11 which casts different first and second images to the user's eyes and the first and second images output by a display panel of the autostereoscopic display 11 may be controlled based on the user's position, in particular based on the distance.

The operation of the portable electronic equipment 1 will be described in more detail with reference to FIGS. 2-11.

Figure 2:
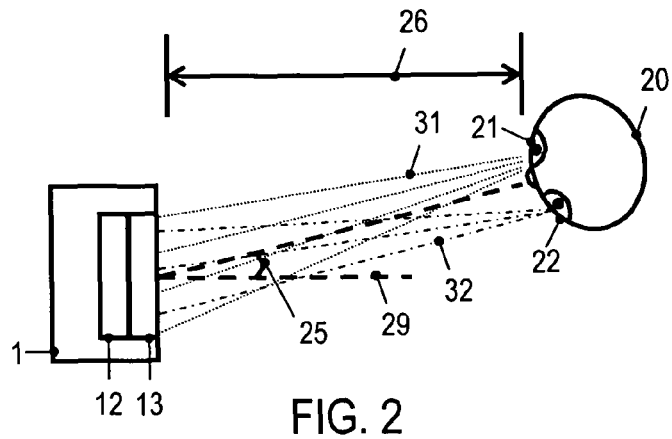
FIG. 2 is a representation illustrating operation of the portable electronic equipment of an embodiment.
Figure 3:
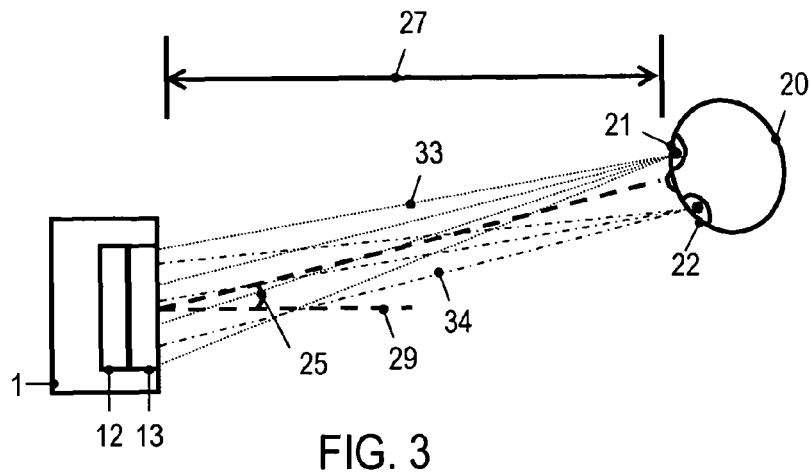
FIG. 3 is a representation illustrating operation of the portable electronic equipment of an embodiment.
Figure 4:
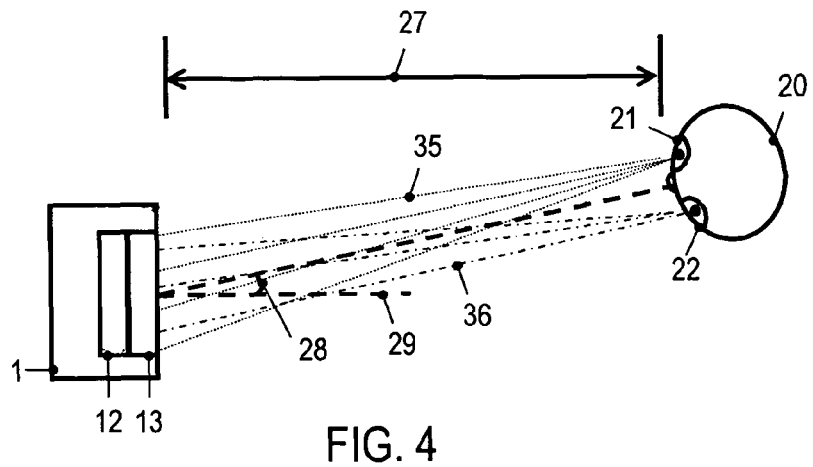
FIG. 4 is a representation illustrating operation of the portable electronic equipment of an embodiment.

FIGS. 2-4 are top views illustrating operation of the portable electronic equipment 1. The autostereoscopic display 11 includes a display panel 12 and at least one electro-optical layer 13. The display panel 12 outputs plural images. The plural images include a first image intended for the user's first eye and a second image intended for the user's second eye. The display panel 12 may be a liquid crystal panel, a light emitting diode (LED)-based panel, or another display panel. The display panel 12 may be configured to output the first image and the second image respectively in a stripe-pattern or a two-dimensional interdigitated pattern, in which sections of the first image and the second image are intercalated. The at least one electro-optical layer 13 is operative to receive the first image and the second image output by the display panel, and to direct the first image into the user's first eye and the second image into the user's second eye. The at least one electro-optical layer 13 may form or may include a lenticular sheet. The lenticular sheet may include a plurality of lenticular lenslets. The at least one electro-optical layer 13 may include at least one liquid crystal cell to form a controllable lenticular sheet. The at least one electro-optical layer 13 may form or may include a parallax barrier which is controllable by applying an electrical signal thereto. The at least one electro-optical layer 13 may form or may include a combination of a parallax barrier and a lenticular sheet. According to general terminology in the art, the term "electro-optical layer" refers to a layer having optical characteristics which are controllable by an electrical signal, in particular by application of a voltage.

The controller of the portable electronic equipment 1 controls both the display panel 12 and the at least one electro-optical layer 13 based on the position sensed by the head/eye tracker. The controller of the portable electronic equipment 1 controls both the display panel 12 and the at least one electro-optical layer 13 based on a distance at which the user is located.

FIG. 2 illustrates operation of the portable electronic equipment 1 when the user 20 is located at a first position relative to the portable electronic equipment 1. The first position may be defined by a distance 26 at which the user is located from a characteristic plane of the autostereoscopic display. The first position may additionally be defined by a direction in which the user 20 is positioned. The direction may be represented by an angle 25 (if only lateral displacement is taken into account) or by a pair of angles (if lateral and vertical displacement are taken into account). The angle(s) defining the direction may be measured between a normal 29 to the autostereoscopic display and a line connecting the user and the intersection point between the normal 29 and the autostereoscopic display.

The controller controls the display panel 12 to output the first image and the second image. Additional images may be output via the display panel, for multi-user applications, for example. The first image and the second image are computed based on the user's position relative to the autostereoscopic display. The controller controls the at least one electro-optical layer 13 based on the user's position relative to the autostereoscopic display. The controller controls the at least one electro-optical layer 13 such that the first image is directed to the user's first eye 21. The corresponding beams are illustrated at 31. The controller controls the at least one electro-optical layer 13 such that the second image is directed to the user's second eye 22. The corresponding beams are illustrated at 32.

When the head/eye tracker detects a change in distance, the electro-optical layer 13 is controlled such that the sweet spot follows the user's movement. The first and second images are adapted based on the new distance.

FIG. 3 illustrates operation of the portable electronic equipment 1 when the user 20 is located at a second position relative to the portable electronic equipment 1. In the second position, the user is located at a distance 27. The direction quantified by the angle(s) 25 has not changed compared to the first position. The controller re-computes the first and second images based on the new distance 27. The direction defines by angle(s) 25 may also be taken into account when re-computing the first and second images. The controller controls the display panel 12 to output the re-computed first image and the re-computed second image. For illustration, the parallax and perspective shift may be adapted to the new user position. The controller controls the at least one electro-optical layer 13 based on the new distance from the autostereoscopic display. The controller controls the at least one electro-optical layer 13 such that the first image is directed to the user's first eye 21, which is now located at a greater distance. The corresponding beams are illustrated at 33. The controller controls the at least one electro-optical layer 13 such that the second image is directed to the user's second eye 22, which is now also located at a greater distance. The corresponding beams are illustrated at 34.

The controller may also adjust the first and second images output by the display panel 12 and the configuration of the at least one electro-optical layer 13 when the direction of the user relative to the autostereoscopic display changes.

FIG. 4 illustrates operation of the portable electronic equipment 1 when the user 20 is located at a third position relative to the portable electronic equipment 1. In the third position, the user is located in a direction defined by angle(s) 28 which is different from the previous direction. The controller re-computes the first and second images based on the new direction. The controller controls the display panel 12 to output the re-computed first image and the second image. The controller controls the at least one electro-optical layer 13 based on the new direction in which the user is located. The controller controls the at least one electro-optical layer 13 such that the first image is directed to the user's first eye 21, which is now located in a different direction. The corresponding beams are illustrated at 35. The controller controls the at least one electro-optical layer 13 such that the second image is directed to the user's second eye 22, which is now also located in a different direction. The corresponding beams are illustrated at 36.

The portable electronic equipment 1 is operative to accommodate a wider range of distances at which the user may be positioned relative to the portable electronic equipment 1. To this end, information indicative of the user's distance is sensed. The sweet spot is adjusted based on the sensed user position. The images output by the display panel controlled based on the sensed distance. The images output by the display panel may be controlled based on both the sensed distance and the sensed direction. This may be done in various ways, as will be explained in more detail with reference to FIGS. 5-8.

Figure 5:
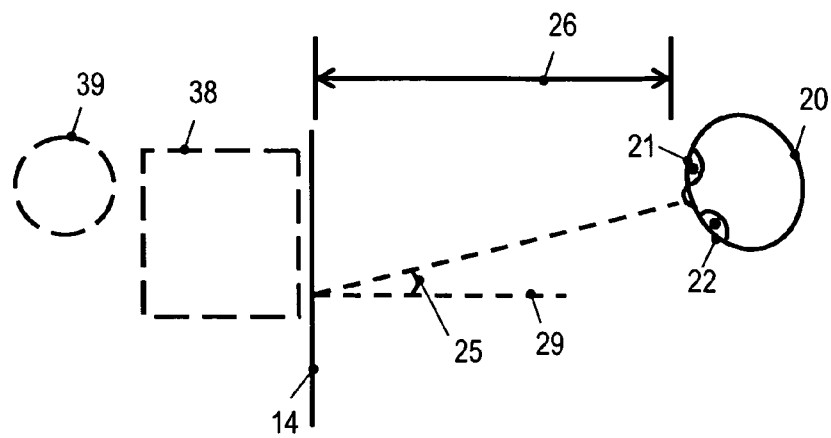
FIG. 5 is a schematic representation illustrating the generation of a stereoscopic view by the portable electronic equipment of an embodiment.

FIG. 5 is a top view illustrating the user 20 and objects 38, 39 which are to be output by the autostereoscopic display. The objects 38, 39 are shown schematically for illustration. The user 20 is positioned at a first distance 26 from a characteristic plane 14 of the autostereoscopic display. The user 20 is positioned in a first direction which may be defined by angle(s) 25.

Figure 6:
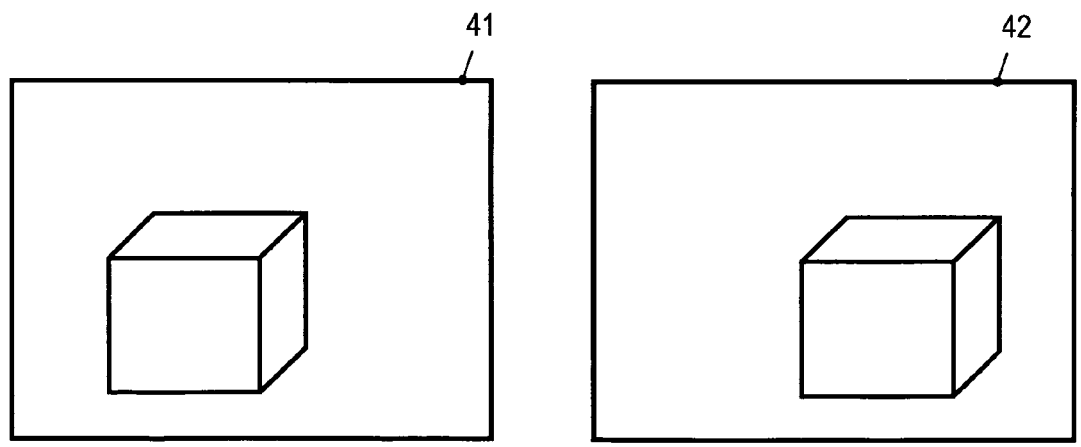
FIG. 6 shows images output by a display panel to generate the stereoscopic view for a user distance shown in FIG. 5.

FIG. 6 shows a first image 41 and a second image 42 computed by the controller. The first image 41 is the view that is to be cast to the user's first eye 21. The second image 42 is the view that is to be cast to the user's second eye 22. For a user positioned at the first distance 26, only object 38 is visible. The first image 41 and second image 42 may be computed in various ways. For illustration, the controller may compute a three-dimensional depth map of a field of view of the user, based on the user's position relative to the autostereoscopic display. The controller may utilize a three-dimensional surface model of objects which are to be displayed to the user when generating the three-dimensional depth map. The controller may compute the first image and the second image based on the three-dimensional depth map and the user's interocular separation.

Figure 7:
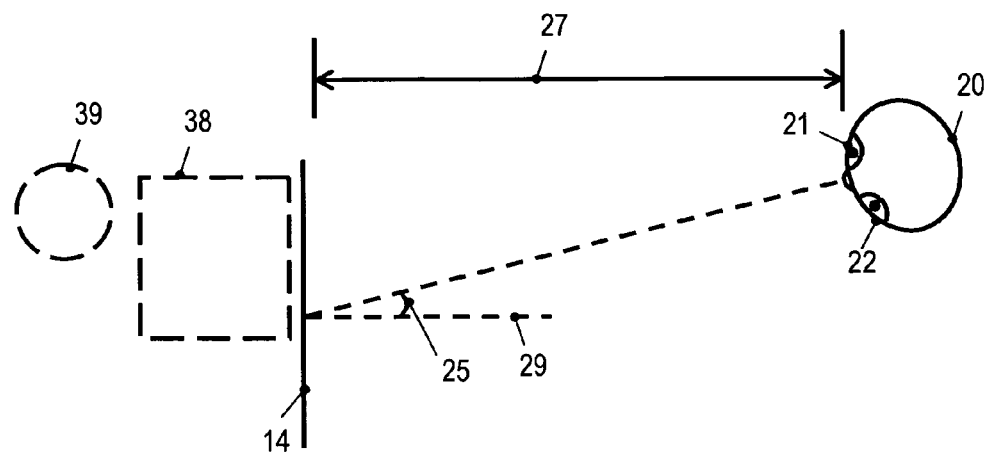
FIG. 7 is a schematic representation illustrating the generation of a stereoscopic view for another distance.

FIG. 7 is a top view illustrating the user 20 and objects 38, 39 when the user is positioned at a second distance 27 greater than the first distance 26.

Figure 8:
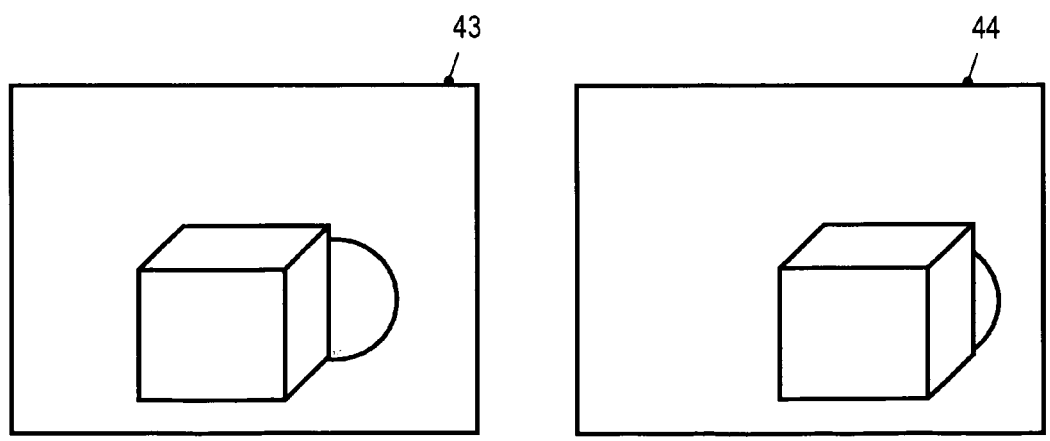
FIG. 8 shows images output by a display panel to generate the stereoscopic view for a user distance shown in FIG. 7.

FIG. 8 shows an updated first image 43 and an updated second image 44 computed by the controller. The updated first and second images take into account the new distance 27. The first and second images are re-computed to take into account the parallax and/or perspective shift that results from the new distance 27. The updated first image 43 is the view that is to be cast to the user's first eye 21. The updated second image 44 is the view that is to be cast to the user's second eye 22. For a user positioned at the second distance 27, object 39 is partially visible behind object 38. The updated first image 43 and second image 44 may again be computed in various ways, as explained for FIG. 6.

The autostereoscopic display of the portable electronic device according to various embodiments includes at least one electro-optical layer that is controlled by the controller based on the distance at which the user is located. The at least one electro-optical layer is controlled such that, for a user positioned at the determined distance, the first image is directed into the user's first eye and the second image is directed into the user's second eye. Additional criteria may be taken into account. For illustration, the controller may control the at least one electro-optical layer such that crosstalk at the determined user position is reduced or minimized. The crosstalk may be defined as the fraction of the light intensity of the second image which reaches the user's first eye, normalized by the fraction of the light intensity of the first image which reaches the user's first eye.

To adjust the distance of the sweet spot, various configurations of the at least one electro-optical layer may be used. For illustration, the at least one electro-optical layer may include a liquid crystal layer having characteristics that change as a function of applied voltage. The at least one electro-optical layer may form a lenticular sheet, a parallax barrier, or a combination of lenticular sheet and parallax barrier, which is controlled in accordance with the distance at which the user is positioned from the display. Configurations of autostereoscopic displays will be explained in more detail with reference to FIGS. 9 and 10.

Figure 9:
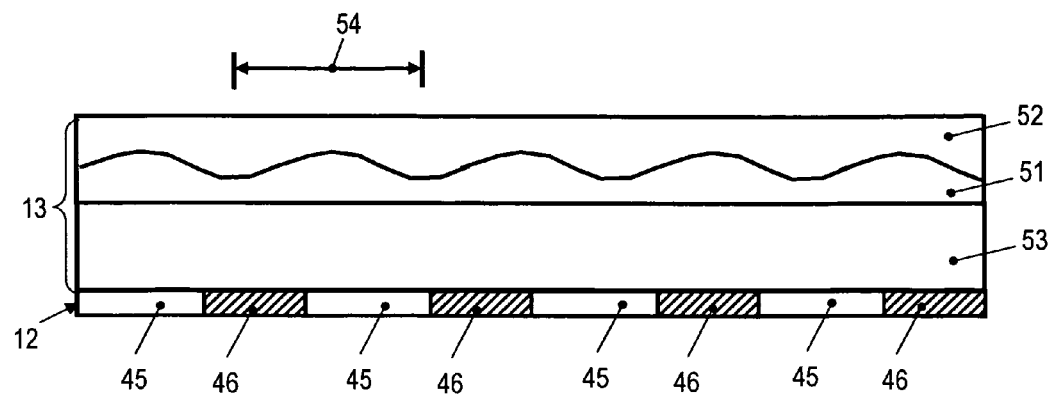
FIG. 9 is a cross-sectional view of an autostereoscopic display of an embodiment.

FIG. 9 is a cross-sectional view of an autostereoscopic display of a portable electronic equipment according to an embodiment. The autostereoscopic display includes a display panel 12 and at least one electro-optical layer 13.

The display panel 12 is controlled to display a first image, which will be directed to the user's first eye, in first regions 45. The display panel 12 is controlled to display a second image, which will be directed to the user's second eye, in second regions 46. The first regions 45 and second regions 46 may be intercalated stripes, for example, or other interdigitated regions.

The at least one electro-optical layer 13 includes a liquid crystal layer 51. The liquid crystal layer 51 may be interposed between other layers 52 and 53. The various layers have optical characteristics which are selected such that the layer structure with layers 51-53 acts as a lenticular sheet. Optical characteristics of at least one of the other layers 52, 53 may also be electrically controllable. The characteristics of the lenticular sheet may be adjusted by adjusting a voltage applied by the controller to the liquid crystal layer 51. Optionally, if one or several of the other layers 52 and 53 are also electrically controllable the voltage applied thereto may also be adjusted based on the distance at which the user is positioned. For illustration, focal lengths of the lenslets of the lenticular sheet may be adjusted by adjusting a voltage applied to one or several layers of the at least one electro-optical layer. The voltage applied to the liquid crystal layer 51 may be adjusted to attain a focal length of the lenslets which is set based on the distance at which the user is positioned, to thereby ensure that the first image is directed into the user's first eye and the second image is directed into the user's second eye for the respectively determined distance at which the user is positioned.

The optical characteristics of the at least one electro-optical layer 51 may be adjusted in various ways. For illustration rather than limitation, refractive characteristics at an interface between layer 51 and one of layers 52 and 53 may be adjusted. Alternatively or additionally, a pitch 54 of a curved surface of the liquid crystal layer may be adjusted. Alternatively or additionally, a curvature radius of a curved surface of the liquid crystal layer may be adjusted.

Figure 10:
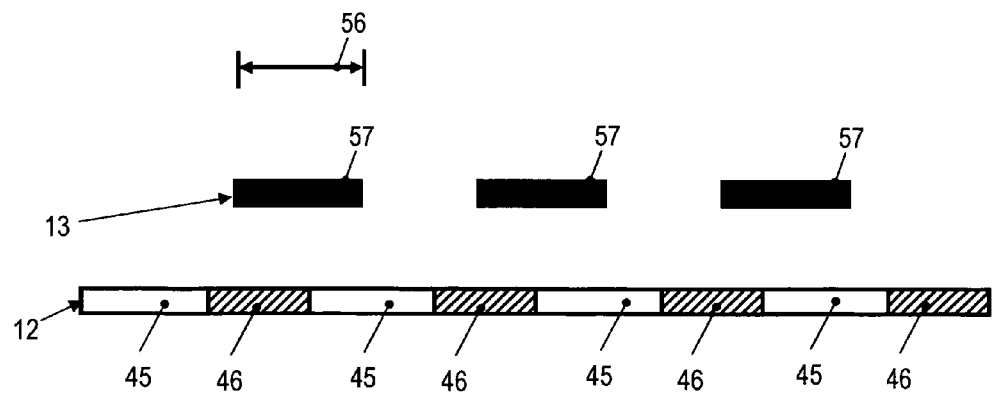
FIG. 10 is a cross-sectional view of an autostereoscopic display of an embodiment.

FIG. 10 is a cross-sectional view of an autostereoscopic display of a portable electronic equipment according to another embodiment. The autostereoscopic display includes a display panel 12 and at least one electro-optical layer 13.

The at least one electro-optical layer 13 forms a parallax barrier layer having parallax barriers 57. The parallax barriers 57 may be implemented using a multi-layer structure of polarizing layers and polarization-dependent filters, for example. At least one of the layers may have characteristics which are electrically controllable. The parallax barriers 57 may be adjusted in accordance with a varying distance at which the user is located. This may be done by controlling the lateral width 56 of the parallax barriers 57, for example, and/or the distance of the parallax barrier 57 from the display panel.

Other configurations of the autostereoscopic display may be used in still further embodiments. For illustration, a combination of a lenticular sheet and parallax barrier may be used. The lenticular sheet and/or the parallax barrier may include an electro-optical layer which is controlled based on the distance at which the user is located.

Figure 11:
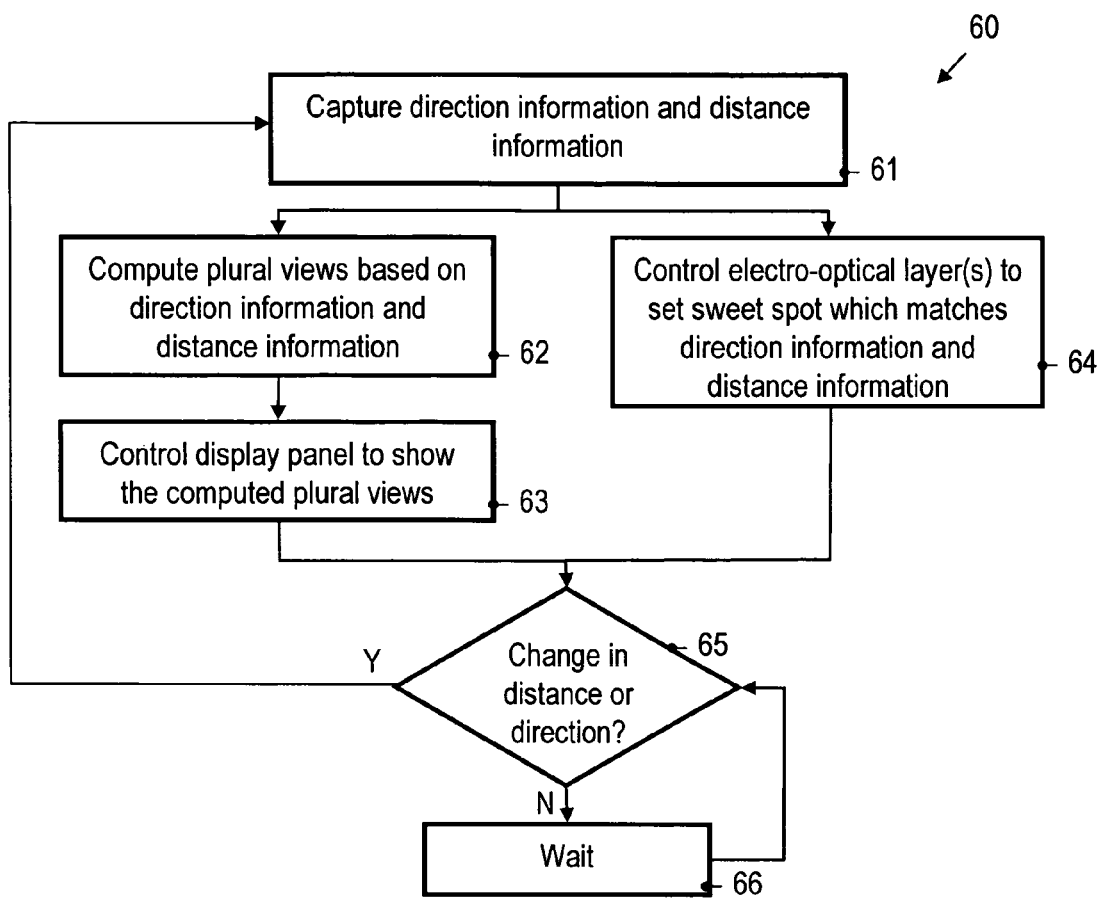
FIG. 11 is a flow chart of a method of an embodiment.

FIG. 11 is a flow chart of a method of an embodiment. The method is generally indicated at 60. The method may be performed by the portable electronic equipment, as explained with reference to FIGS. 1-10.

At 61, information on a position of the user is captured. The information may be captured using a head tracker, an eye tracker, or another sensor device operative to determine the position of the user. The information may include distance information indicating a distance at which the user is positioned and direction information indicating a direction in which the user is positioned.

Both a display panel and at least one electro-optical layer distinct from the display panel are controlled based on the determined user position.

At 62, plural images to be output by the display panel are computed. The plural images may be computed based on the distance information and the direction information. The plural images may include a first image to be cast to the user's first eye and a second image to be cast to the user's second eye. The first image and the second image may be computed such that the parallax and perspective shift is determined based on the captured position of the user. At 63, the display panel is controlled to show the plural images.

At 64, one or several electro-optical layer(s) of the autostereoscopic display are controlled based on the determined distance at which the user is located and a direction in which the user is located. The electro-optical layer(s) may be controlled such that the sweet spot of the autostereoscopic display matches the position determined at 61.

The control commands output to the display panel and the at least one electro-optical layer may be updated when the user's position changes. The method may include monitoring, at 65, whether either one of the distance at which the user is located or the direction in which the user is located changes. If neither the distance nor the direction changes, the method may continue the monitoring after a wait period at 66.

When it is detected that the distance at which the user is located or the direction in which the user is located changes, the method returns to 61. The plural images are re-computed based on the new position. The sweet spot is adapted to match the new user position.

Additional or alternative steps may be used in the method 60. For illustration, a detected change in user position may be subjected to a threshold comparison. The re-computation of the plural images and adjustments to the at least one electro-optical layer may be performed selectively based on a result of the threshold comparison. In this case, a change in distance from the autostereoscopic display will cause the controller to re-compute the images and to adjust the at least one electro-optical layer selectively based on a threshold comparison of the distance change.

The portable electronic equipments and the methods of embodiments provide enhanced comfort for the user. The user is allowed to change the distance from the autostereoscopic display over wider ranges. The controller re-computes the plural images and adjusts the at least one electro-optical layer in response to a change in distance, even when the user remains positioned in the same direction relative to the autostereoscopic display.

While portable electronic equipments and methods of controlling an autostereoscopic display of the portable electronic equipment have been described with reference to the drawings, modifications and alterations may be implemented in further embodiments. For illustration rather than limitation, while exemplary implementations for a head and eye tracker have been described, other or additional sensor componentry may be used. For illustration, the sensor device which identifies the position of the user's eyes relative to the display may include a gyroscope or other acceleration sensor. The sensor device which identifies the position of the user's eyes may include componentry provided separately from and externally of the housing in which the autostereoscopic display is mounted.

For further illustration, while the image directing device may include one or plural electro-optical layers which receive the images output by the display panel, other implementations for the image directing device may be used. The image directing device may include mechanical elements which adjust light emitting elements of the display panel, for example. The image directing device may include other electrically controllable elements, such as an array of electrically adjustable mirrors.

For further illustration, the sensor device which provides direction and distance information may include sub-sensors. One of the sub-sensors may sense the direction information. Another one of the sub-sensors may sense the distance information.

For further illustration, while the distance at which the user is positioned from a characteristic plane of the autostereoscopic display, measured normal to the plane, may be used as distance information, the distance information may take any one of a variety of formats. For illustration, when a stereo camera is used to determine the user's position, a pixel disparity may be used as distance information. For further illustration, the distance may be measured as length between a center of the autostereoscopic display and a center point between the user's eyes.

For further illustration, while the generation and outputting of two images has been described in the context of embodiments, the autostereoscopic display may also be configured as a multi-view autostereoscopic 3D display, i.e., as a automultiscopic display. In this case, distances of plural users may be monitored.

Examples for portable electronic equipments which may be configured as described herein include, but are not limited to, a mobile phone, a cordless phone, a personal digital assistant (PDA), and the like.

The invention claimed is:

1. A portable electronic equipment, comprising:
    an autostereoscopic display comprising a display panel and an image directing device, the display panel being configured to output plural images, and the image directing device being configured to direct a first image of the plural images to a first eye and a second image of the plural images to a second eye of a user;
    a controller coupled to the autostereoscopic display to control the display panel and the image directing device; and
    a sensor device configured to capture distance information indicative of a distance at which the user is positioned from the autostereoscopic display and to capture direction information indicative of a direction in which the user is positioned relative to the autostereoscopic display;
    the controller being coupled to the sensor device and being configured to
        compute the plural images to be output based on the distance information and/or direction information,
        control the display panel to output the computed plural images, and
        control the image directing device based on the distance information and/or direction information.

2. The portable electronic equipment of claim 1, wherein the controller is configured to control the display panel and the image directing device based on both the distance information and the direction information.

3. The portable electronic equipment of claim 2, wherein the controller is configured to compute the plural images based on the distance information and the direction information.

4. The portable electronic equipment of claim 2, wherein the controller is configured to compute the first image and the second image having a parallax and perspective shift determined based on the distance information.

5. The portable electronic equipment of claim 2, wherein the controller is configured to compute a three-dimensional depth map based on the distance information and the direction information, and to compute the plural images based on the three-dimensional depth map and an interocular separation.

6. The portable electronic equipment of claim 1, wherein the controller is configured to control the image directing device to set a sweet spot of the autostereoscopic display which matches the distance information and the direction information.

7. The portable electronic equipment of claim 1, wherein the controller is configured
    to monitor changes in the distance information and the direction information, and
    to re-compute the plural images in response to a change in the distance information or the direction information.

8. The portable electronic equipment of claim 1, wherein the image directing device comprises a liquid crystal layer.

9. The portable electronic equipment of claim 8, wherein the controller is configured to control the liquid crystal layer based on the distance information to adjust a distance of a sweet spot of the autostereoscopic display such that it matches the distance information.

10. The portable electronic equipment of claim 8, wherein the image directing device forms a lenticular sheet which comprises the liquid crystal layer.

11. The portable electronic equipment of claim 10, wherein the controller is configured to adjust a focal length of lenslets of the lenticular sheet.

12. The portable electronic equipment of claim 1, wherein the sensor device is configured as a head tracker and/or eye tracker.

13. The portable electronic equipment of claim 12, wherein
    the sensor device comprises at least one camera, and
    the controller is configured to determine a distance at which the user is positioned from the autostereoscopic display based on plural images captured by the at least one camera.

14. A method of controlling an autostereoscopic display, the autostereoscopic display comprising a display panel and an image directing device, the image directing device directing a first image output by the display panel to a first eye of a user and a second image output by the display panel to a second eye of the user, the method comprising:
    receiving, from a sensor device, distance information indicative of a distance at which the user is positioned from the autostereoscopic display and direction information indicative of a direction in which the user is positioned relative to the autostereoscopic display;

computing plural images to be output based on the distance information and/or direction information;

controlling the display panel to output the computed plural images; and controlling the image directing device based on the distance information and/or direction information, wherein said method is performed by the portable electronic equipment of claim 1.

15. A method of controlling an autostereoscopic display, the autostereoscopic display comprising a display panel and an image directing device, the image directing device directing a first image output by the display panel to a first eye of a user and a second image output by the display panel to a second eye of the user, the method comprising:

receiving, from a sensor device, distance information indicative of a distance at which the user is positioned from the autostereoscopic display and direction information indicative of a direction in which the user is positioned relative to the autostereoscopic display;

computing plural images to be output based on the distance information and/or direction information;

controlling the display panel to output the computed plural images; and controlling the image directing device based on the distance information and/or direction information.

* * * * *

UNITED STATES PATENT AND TRADEMARK OFFICE
CERTIFICATE OF CORRECTION

PATENT NO. : 9,544,578 B2  Page 1 of 1
APPLICATION NO. : 14/372945
DATED : January 10, 2017
INVENTOR(S) : Anders Linge et al.

It is certified that error appears in the above-identified patent and that said Letters Patent is hereby corrected as shown below:

On the Title Page
Correct Assignees in item [73], as follows:

[73] Sony Corporation, Tokyo, Japan;
Sony Mobile Communications Inc., Tokyo, Japan Signed and Sealed this
Seventh Day of February, 2017

Michelle K. Lee
*Director of the United States Patent and Trademark Office*